United States Patent [19]
Watanabe et al.

[11] Patent Number: 5,145,528
[45] Date of Patent: Sep. 8, 1992

[54] COATING APPARATUS

[75] Inventors: Keigo Watanabe, Neyagawa; Hiroyuki Naka, Osaka; Takashi Ichiyanagi, Hirakata, all of Japan

[73] Assignee: Matsushita Electric Industrial Co., Ltd., Osaka, Japan

[21] Appl. No.: 665,225

[22] Filed: Mar. 6, 1991

[30] Foreign Application Priority Data

Mar. 7, 1990 [JP] Japan .................................. 2-55323

[51] Int. Cl.[5] .............................................. B05C 5/02
[52] U.S. Cl. .................................... 118/411; 118/412; 118/419; 427/286
[58] Field of Search ............... 118/211, 410, 411, 419, 118/412; 427/286

[56] References Cited

U.S. PATENT DOCUMENTS

| 2,703,432 | 3/1955 | Baty et al. | 118/410 |
| 3,278,960 | 10/1966 | Nardone | 118/211 |
| 3,461,843 | 8/1969 | Noon | 118/410 |
| 3,511,730 | 5/1970 | Carder | 118/411 |
| 4,995,339 | 2/1991 | Tobisawa et al. | 118/410 |

Primary Examiner—Michael G. Wityshyn
Attorney, Agent, or Firm—Wenderoth, Lind & Ponack

[57] ABSTRACT

An apparatus for applying coating material in the form of stripes onto a film traveling in a predetermined direction is provided with a coating material nozzle which effuses coating material while supporting the film. The contact support surface of the nozzle in contact with the film is a flat surface, along which the film travels. The coating material nozzle has thereon applicator grooves for uniformly forming the cross-sectional shape of coating material applied in the form of stripes onto the film. Effusion ports or discharge ports for coating material are provided in the bottom surface of the applicator grooves. Coating material is fed to the coating material nozzle through a gear pump, which is adapted to control the coating material supply so that the coating material within the applicator grooves has a pressure lower than atmospheric pressure. In addition, there may be provided a plate member for blowing air uniformly and opposed to the contact support surface of the coating material nozzle contacted by the film. The air from this plate is blown against the traveling film on its rear side.

3 Claims, 7 Drawing Sheets

COATING APPARATUS

BACKGROUND OF THE INVENTION

1. Field of the Invention

The present invention relates to a coating apparatus for applying a liquid coating material in stripe form onto a thin film that travels in a predetermined direction.

2. Description of the Prior Art

For the application of a coating material onto various types of photographic films, magnetic tapes, photographic paper, or other thin films, a variety of coating methods are now available, each chosen depending on the purpose for which it is used. The methods include one disclosed in Japanese Patent Publication No. 4471/1990 (corresponding to U.S. application Ser. No. 07/428,515, now U.S. Pat. No. 5,045,358) which is known as one of the most efficient coating methods especially for performing stripe coating.

According to this coating method, as shown in FIG. 9, while a film 101 is traveling in a fixed direction, a coating material nozzle comprising a pair of block-like applicator dies 102 and 103 is kept in contact with the film and coating material is discharged through a plurality of coating material discharge ports 105 formed and arranged on the end of the nozzle, so that liquid coating material is applied in stripe form onto the film 101.

On the assembled block-like applicator dies 102 and 103 there is formed a lip portion 108 that protrudes forward to make contact with the film 101. Further, within the assembled applicator dies 102 and 103 there is formed a chamber that serves as a coating material reservoir 106. Coating material is supplied into this chamber 106 from a supply unit (not shown) provided independently of the nozzle 104, being temporarily stored in the chamber. The coating material is discharged from the coating material reservoir 106 through a flow groove 107 and out of the coating material discharge ports 105. The coating material discharge ports 105 are provided in the bottom surface of each of a plurality of applicator grooves 109 which are formed in the end surface 110 forming the lip portion 108. The applicator grooves 109 are provided in the end surface 110 of the lip portion 108 so as to extend in the traveling direction of the film 101 and are positioned at equal intervals in the widthwise direction of the film 101. The lip portion end surface 110 having the applicator grooves 109 thereon is formed as a curved surface with a constant curvature and the nozzle 104 is urged against the film 101 so that the film 101 will travel along the curved surface, whereby the film 101 itself will remain in contact with the nozzle 104 constantly and positively by virtue of the film tension, whereby the applied coating material will have a constant thickness and shape on the film 101.

However, the above-described prior art apparatus has the following problems. Since the film 101 travels while remaining in contact with the lip portion end surface 110 at a certain surface pressure, dust and film residues adhering to the film 101 will adhere to and accumulate on the end surface 110, causing irregularities to be formed on the lip portion end surface 110 that has been formed as a smooth curved surface. This makes it difficult to keep the film 101 in constant and positive contact with the lip portion end surface 110, adversely affecting the layer of coating material applied onto the film, especially with respect to layer-thickness accuracy. In particular, when the length of the film 101 exceeds approximately 1000 m, the resulting irregularities are remarkably increased so as to cause a coating failure.

SUMMARY OF THE INVENTION

Accordingly, in view of the foregoing problems, an essential object of the present invention is to provide an apparatus that can prevent dust and film residues adhering to a traveling film from adhering to and accumulating on the end surface of the nozzle and therefore that can achieve stable stripe coating over a long period without any coating failures.

In accomplishing this and other objects, according to the first preferred embodiment of the present invention, there is provided an apparatus for applying coating material in stripe form to a film traveling in a predetermined direction, which comprises:

film conveying means for causing the film to travel in the predetermined direction;

a coating material discharge nozzle for discharging the coating material, and adapted to make contact with the film traveling in a predetermined direction so as to support the film, the coating material discharge nozzle having a support surface formed as a curved surface so as to cause the film to travel therealong, the nozzle having a plurality of applicator grooves formed in the support surface and arranged in the crosswise direction of the traveling film at substantially equal intervals, the applicator grooves having a substantially constant depth and extending in the film traveling direction, the nozzle having coating material discharge ports formed in the bottom of each of the applicator grooves to allow coating material to be discharged therethrough, the nozzle having gas discharge ports provided in the support surface between each two applicator grooves to discharge a gas between the support surface and the film; and means for supplying gas to the gas discharge ports of the coating material discharge nozzle.

With such an arrangement as described above, the film travels along the curved support surface of the nozzle, causing the film to apply a pressure to the support surface in the form of components of the film tension. The gas discharged through the gas discharge port forms a uniform gaseous layer between the support surface and the film, causing the film to be floated by the gas pressure. As a result, the film travels while keeping a surface pressure necessary for coating application and yet avoiding direct contact with the support surface, thereby preventing dust and film residues existing on the film from adhering to and accumulating on the support surface. Accordingly, a coating material layer having a constant thickness can be applied stably and formed without any failure over a long period.

According to the second preferred embodiment of the present invention, there is provided an apparatus for applying coating material in stripe form on a film traveling in a predetermined direction, which comprises:

film conveying means for causing the film to travel in the predetermined direction;

a coating material effusion nozzle for effusing the coating material, and adapted to make contact with the film traveling in the predetermined direction so as to support the film, the coating material effusion nozzle having a support surface formed as a flat surface so as to cause the film to travel therealong, the nozzle having a plurality of applicator grooves formed in the support surface and arranged in the crosswise direction of the traveling film at substantially equal intervals, the applicator grooves having a substantially constant depth and extending in the film traveling direction, the nozzle having coating material effusion ports formed in the bottom of each of the applicator grooves and allowing coating material to be effused therethrough; and means for supplying coating material to the coating material effusion nozzle in a quantity so that the coating material is effused through the coating material effusion ports into the applicator grooves at a pressure lower than atmospheric pressure.

With such an arrangement, a film travels at a pressure of approximately zero against the support surface of the nozzle because the support surface is a flat surface. It will almost never happen, therefore, that dust and film residues existing on the film adhere to and accumulate on the support surface. However, if they do, it is impossible to ensure a stably supported state of the film by means of the support surface necessary for the coating application. Due to this, the coating material supplied to the nozzle is reduced in quantity below a predetermined level, whereby the pressure of the coating material that exists in the applicator grooves is lowered to less than atmospheric pressure. As a result, the film is sucked forward the coating material at portions where it confronts the grooves, thereby ensuring a stably supported state of the film by means of the support surface necessary for coating application. Thus, the coating material can be stably applied and the coating layer can be constantly formed over a long period without being affected by wrinkles and vibrations of films.

According to the third preferred embodiment of the present invention, an apparatus is provided for applying coating material in stripe form on a film traveling in a predetermined direction, which comprises:

film conveying means for causing the film to travel in the predetermined direction;

A coating material effusion nozzle for effusing the coating material, and adapted to make contact with the film traveling in the predetermined direction so as to support the film, the coating material effusion nozzle having a support surface formed as a flat surface so as to cause the film to travel therealong, the nozzle having a plurality of applicator grooves formed in the support surface and arranged in a crosswise direction of the traveling film at substantially equal intervals, the applicator grooves having a substantially constant depth and extending in the film traveling direction, the nozzle having coating material effusion ports formed in the bottom of each of the applicator grooves and allowing coating material to be effused therethrough;

means for supplying coating material to the coating material effusion nozzle; and gas blowing means confronting the support surface with the traveling film interposed therebetween, for blowing a gas toward the traveling film so that the coating material supplied in the applicator grooves is constantly applied on the traveling film.

With such an arrangement as described above, a film travels at a pressure of approximately zero against the support surface of the nozzle because the support surface is a flat surface. It will rarely happen, therefore, that dust and film residues existing on the film adhere to and accumulate on the support surface. However, if they do, it is impossible to ensure a stably supported state of the film by means of the support surface necessary for coating application. Due to this, a gas such as air is blown on the film traveling along the support surface from the rear side of the film. As a result, the film is urged toward the coating material, thereby ensuring the stably supported state of the film by means of the support surface necessary for the coating application. Thus, the coating material can be stably applied and the coating layer can be constantly formed over a long period without being affected by wrinkles and vibrations of film. In particular, if this arrangement is combined with the suction effect of coating material according to the second embodiment, there can be achieved a travel state of the film more stable than in the second embodiment and which is higher in speed.

BRIEF DESCRIPTION OF THE DRAWINGS

These and other objects and features of the present invention will become apparent from the following description taken in conjunction with the accompanying drawings, in which.

Figure 1:
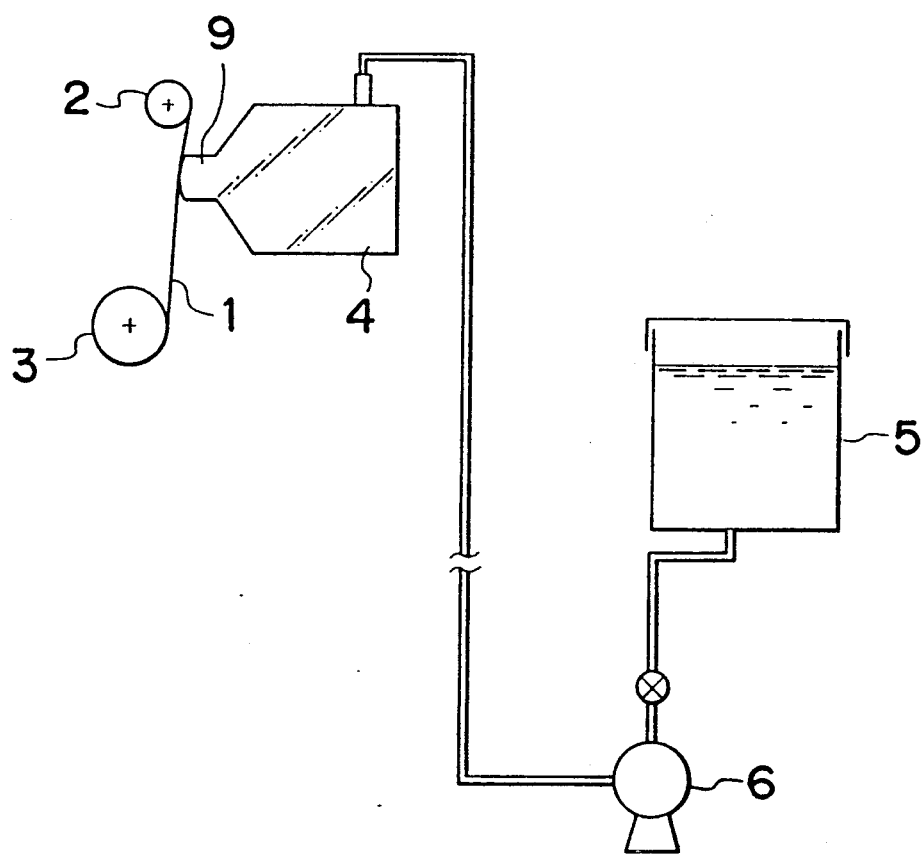
FIG. 1 is a schematic view showing the coating apparatus according to the first embodiment of the present invention.

DETAILED DESCRIPTION OF THE INVENTION (First Embodiment)

Before proceeding with the description of the present invention, it is to be noted that like parts are designated by like reference numerals throughout the accompanying drawings.

Referring first to FIG. 1, in the coating apparatus of the first embodiment, a base-material thin film 1 to which coating material is to be applied is stretched between a take-up roll 2 and a feed roll 3 to travel upward from below by the rotation of take-up roll 2. Against this film 1 that travels keeping a constant tension between the two rolls 2 and 3, a coating material discharge nozzle 4 is urged. Accordingly, as the film 1 travels it is bent at its contact point with the nozzle 4. Coating material, which is stored in a reservoir tank 5, is forcedly supplied to the nozzle 4 through a gear pump 6. As products to be manufactured by the apparatus of the present embodiment are dielectric layer films for use in multi-layer type capacitors, the base-material thin film 1 is a transparent film made from PET (polyethylene terephthalate), while PPO (polyphenylene oxide) is used as the coating material.

Figure 2:
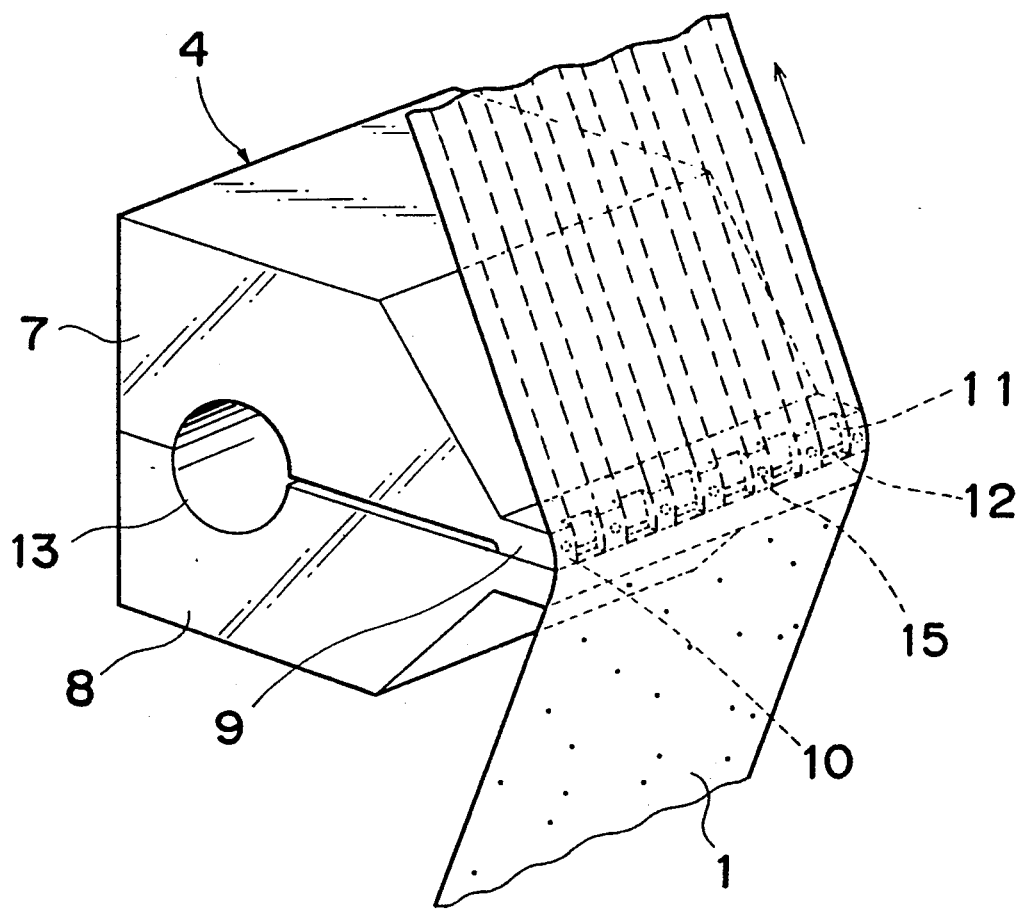
FIG. 2 is a perspective view showing the nozzle and the surfaces thereof of a coating apparatus of the first embodiment of the present invention.
Figure 3:
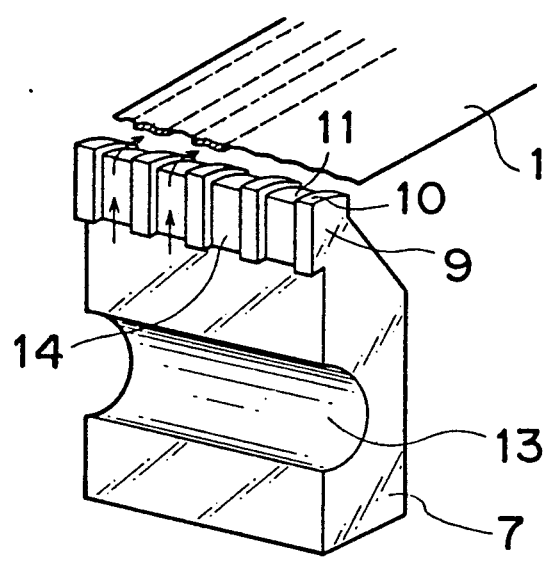
FIG. 3 is an enlarged perspective view of a main portion of the nozzle in FIG. 2.

The nozzle 4, as shown in FIG. 2, has a pair of upper and lower block-like applicator dies 7 and 8, both side faces of which are closed by plates, not illustrated, to complete the nozzle. The end portion of the nozzle 4 is formed into a lip portion 9 that protrudes forward, and the end surface 10 of the lip portion 9 is formed as a curved surface with a constant curvature. The end surface 10 is brought into contact with the traveling film 1 at a certain contact pressure to function as a support surface 10 therefor. In this support surface 10 there are provided a plurality of grooves 11 extending in the travel direction of the film 1 and spaced in the crosswise direction thereof at equal intervals. These grooves 11 are applicator grooves for forming coating material applied onto the film 1 into a predetermined cross-sectional shape. The bottom of each of the applicator grooves 11 has a discharge port 12 opening thereinto through which coating material is discharged. In the applicator dies 7 and 8 a chamber is formed that will serve as a coating material reservoir 13 within the assembled dies. In this chamber 13, coating material is temporarily stored after being fed from the reservoir tank 5 through the gear pump 6. As shown in FIG. 3, which is a perspective view of the upper die 7 as viewed from below, discharge grooves 14 are formed which communicate with the discharge ports 12 and the chamber of the coating material reservoir 13.

Figure 4:
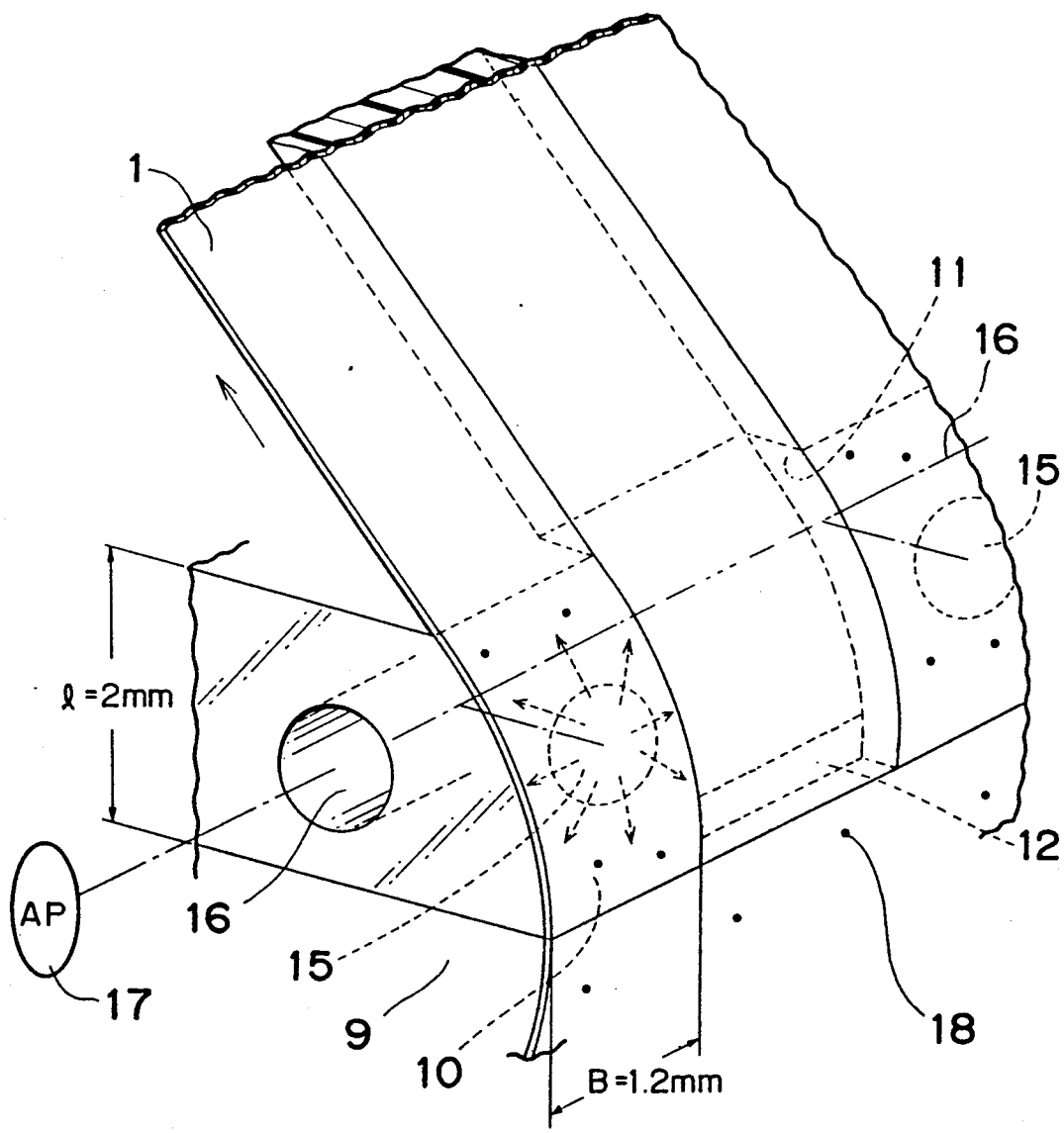
FIG. 4 is a perspective view showing the interior of the upper block-like applicator die in FIG. 2.

Each support surface 10 located between each two applicator grooves 11 has therein a gas effusion port 15 opening out of approximately the middle thereof. Each gas effusion port 15, as shown in FIG. 4, communicates with a gas supply hole 16 (indicated by the dash-and-dot line) which is drilled from the side face of the lip portion 9 so as to extend in the crosswise direction of the nozzle 4. The gas supply hole 16 is fed with a predetermined constant amount of air from an air pump 17, which air is effused from the gas effusion ports 15 between the support surface 10 and the film 1.

In the coating apparatus as constructed above, an air layer is formed between the traveling film 1 and the support surface 10 of the nozzle 4. This means that the film 1 floats and is spaced from the support surface 10 so as to be supported without making contact therewith. Accordingly, even if dust and film residues adhere on the surface of the film 1, such dust and film residues will not transfer to and accumulate on the support surface 10. Therefore, the film 1 is not elevated by any deposits on the support surface 10. Moreover, since the film 1 can travel while keeping a constant tension with respect to the coating material discharge pressure, the coating material on the film surface will never be subject to a change in thickness.

With respect to one support surface 10 located between adjoining two applicator grooves 11, there is explained below the quantity of air caused to effuse through the associated gas effusion port 15. If the diameter of the gas effusion port 15 is approximately 0.6 mm for a width $B=1.2$ mm and $l=2$ mm of each support surface 10, then it has been proven that the gap between the floating film 1 and the surface 10 reaches as much as approximately 10 $\mu$m providing that the air flow rate is 0.1 cc/sec. Further, when a coating experiment was carried out under the above conditions, it was verified that no dust or residue of the film 1 adhered to the support surface 10 even when the length reached 1000 m.

Although air is effused through the gas effusion port 15 as means for making the film 1 float in this embodiment, other gases also may be used in place of air.

Moreover, although in the above embodiment the gas effusion port 15 is shaped as a circle and is positioned in approximately the middle of each support surface 10, the arrangement of the gas effusion port 15 is not limited to this but the shape, number, and location are determined so as to provide a uniform gap of the film 1 from surface 10 over the entire range of the support surface 10.

(Second Embodiment)

The present invention is now described with reference to the second embodiment.

This embodiment differs from the first one in that the support surface of the end of the lip portion is not a curved surface but a vertical flat surface, so that a film is caused to travel along the flat surface, and that the gas effusion ports and the gas supply hole communicating therewith are omitted. Of course, the air pump for supplying air to the hole is also omitted. In the first embodiment, the contact between the film and the support surface is eliminated while the urging force of the film acting on the support surface is maintained, requiring gas effusion ports in the resulting arrangement. This being the case, it will easily be understood that some difficulties may arise in controlling the gas effusion ports in terms of the efficiency of mass production of coated film. For example, if the film is cut off or some other trouble occurs, there is a possibility that coating material may flow into the gas effusion ports and, when solidified, cause the coating apparatus to be unusable until the solidified coating material is washed away. In view of the foregoing problems, the second embodiment provides a coating apparatus which has a simple arrangement eliminating gas effusion ports, as in conventional coating apparatus, and yet which prevent dust or film residue from adhering to the support surface so that the coating material applied on the film has a constant thickness.

Figure 5:
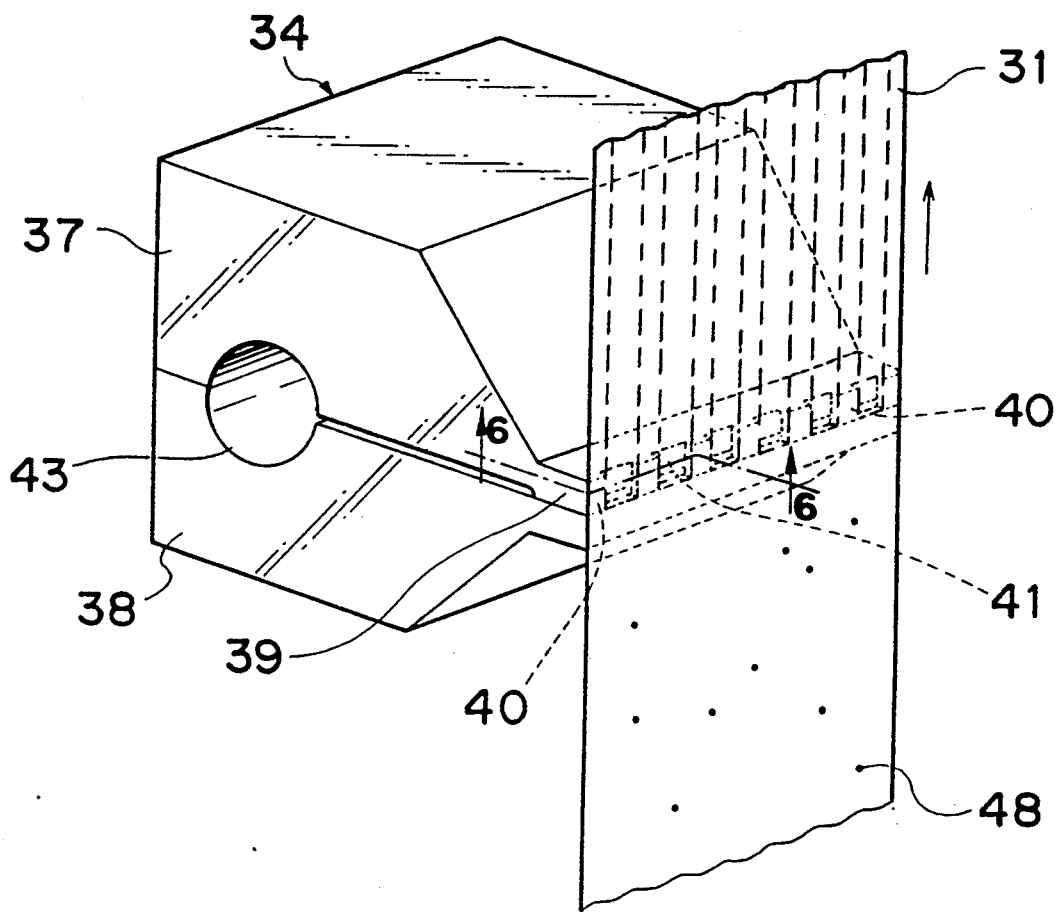
FIG. 5 is a perspective view showing the nozzle and the surfaces thereof of a coating apparatus of the second embodiment of the present invention.

In FIG. 5, reference numeral 31 denotes a film, 34 a coating material effusion nozzle, 37 and 38 block-like applicator dies, 39 a lip portion, 40 a support surface, 41 an applicator groove, and 43 a chamber that will be a coating material reservoir. The rest of the arrangement is the same as in FIG. 1, and parts are designated by the same reference numerals.

The support surface 40, which is the end surface of the lip portion 39, is a flat surface. The film 31 is positioned against this flat surface during its travel in the vertical direction. As a result, the surface pressure of the film 31 against the support surface 40 becomes zero due to film tension, and thus dust and film residue 48 existing on the film 31 are prevented from adhering to the support surface 40 to a substantially great extent.

Figure 6:
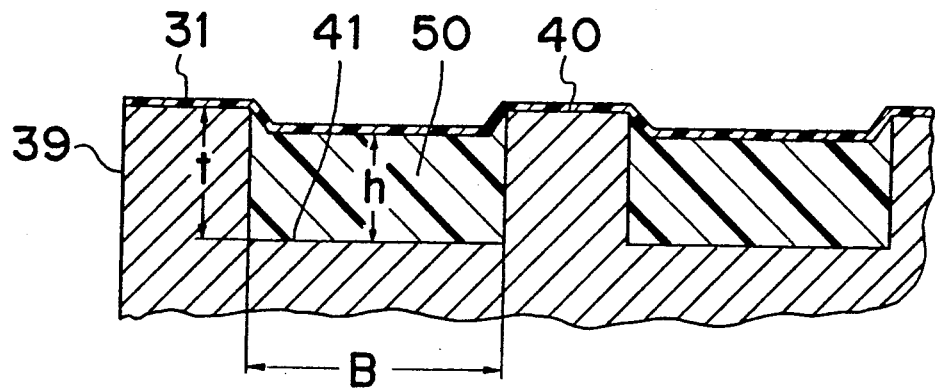
FIG. 6 is a sectional view taken along line 6—6 in FIG. 5.

On the other hand, a zero surface pressure may cause the film 31 to make unstable contact with the support surface 40 due to the effects of wrinkles or traveling vibrations of the film, which may lead to some coating failure. This second embodiment, however, provides a solution for this problem by controlling the amount of coating material supplied to the applicator grooves 41 in a manner as described below. FIG. 6 is a sectional view taken along line 6—6 in FIG. 5, showing a state in which the film 31 is traveling with the applicator grooves 41 filled with coating material 50. In the figure, the depth of the groove 41 is designated by t and the width thereof by B, while the depth of the coating material 50 filled in the groove 41, i.e. the distance from the bottom surface of the groove to the film surface, is designated by h.

In this case, if the liquid pressure of the coating material 50 is approximately equal to atmospheric pressure, then it follows that h=t and that the resulting thickness H in the wet state of the coating material on the film is:

$$H = h/2 \quad (1)$$

Accordingly, the flow rate Q required to form the wet coating material layer thickness H is:

$$Q = H \times B \times V \quad (2)$$

where V is the travel speed of the film 31.

On the other hand, the flow rate $Q_1$ supplied by a gear pump 6 is a constant value. Hence, if the coating material supply is controlled for causing a relation that $Q_1 < Q$, there will be a deficiency of coating material supplied with the result that the coating material 50 within the grooves 41 falls to a negative pressure relative to atmosphere. This phenomenon acts on the film so that only the portions of the film 31 corresponding to the grooves 41 are drawn toward the coating material 50, that is, the film 31 travels with the drawn portions thereof slightly dented. Thus, although the surface pressure of the film 31 on surface 40 is zero, the film 31 travels stably so as to cause a uniform layer of the coating material to be formed on film 31.

(Third Embodiment)

Figure 7:
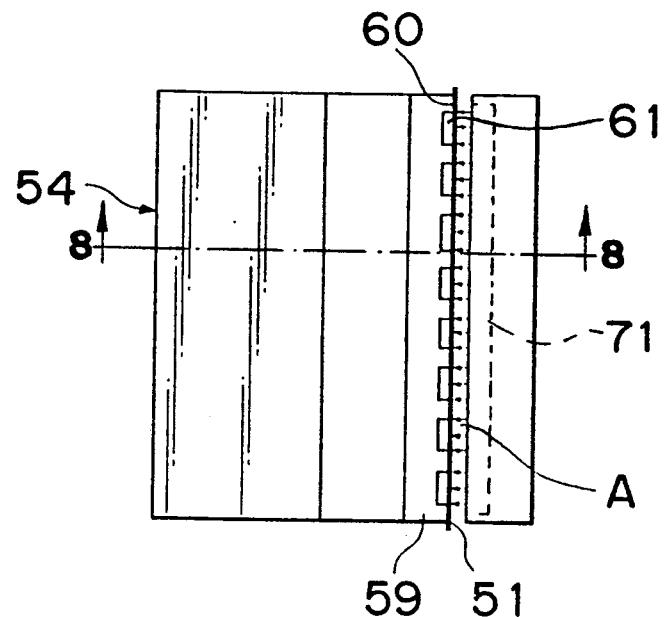
FIG. 7 is a plan view showing the nozzle and the surfaces thereof of a coating apparatus of the third embodiment of the present invention.

In this embodiment, as shown in FIG. 7, a gas blowoff plate 71 is provided in addition to the elements of the second embodiment. This element is intended to enhance the travel stability of the film in a higher speed range. The suction effect of the coating material obtained in the second embodiment has a limitation with respect to the travel speed of the film. That is, the more the travel speed of the film increases, the more the travel stability thereof decreases. Incidentally, for the coating material used in the second embodiment, the contact pressure of the film against the support surface is estimated to be approximately 0.04 kgf/cm$^2$, under which a sufficient travel stability of the film can be obtained at a travel speed of up to approximately 100 m/min.

Figure 8:
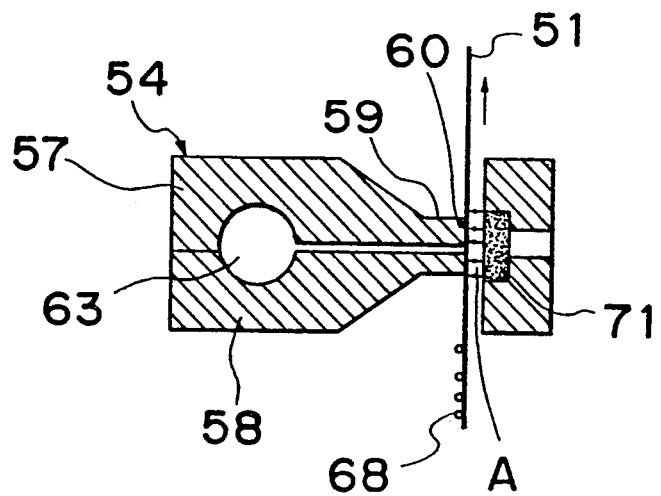
FIG. 8 is a view of FIG. 7 taken along line 8—8 of FIG. 7.
Figure 9:
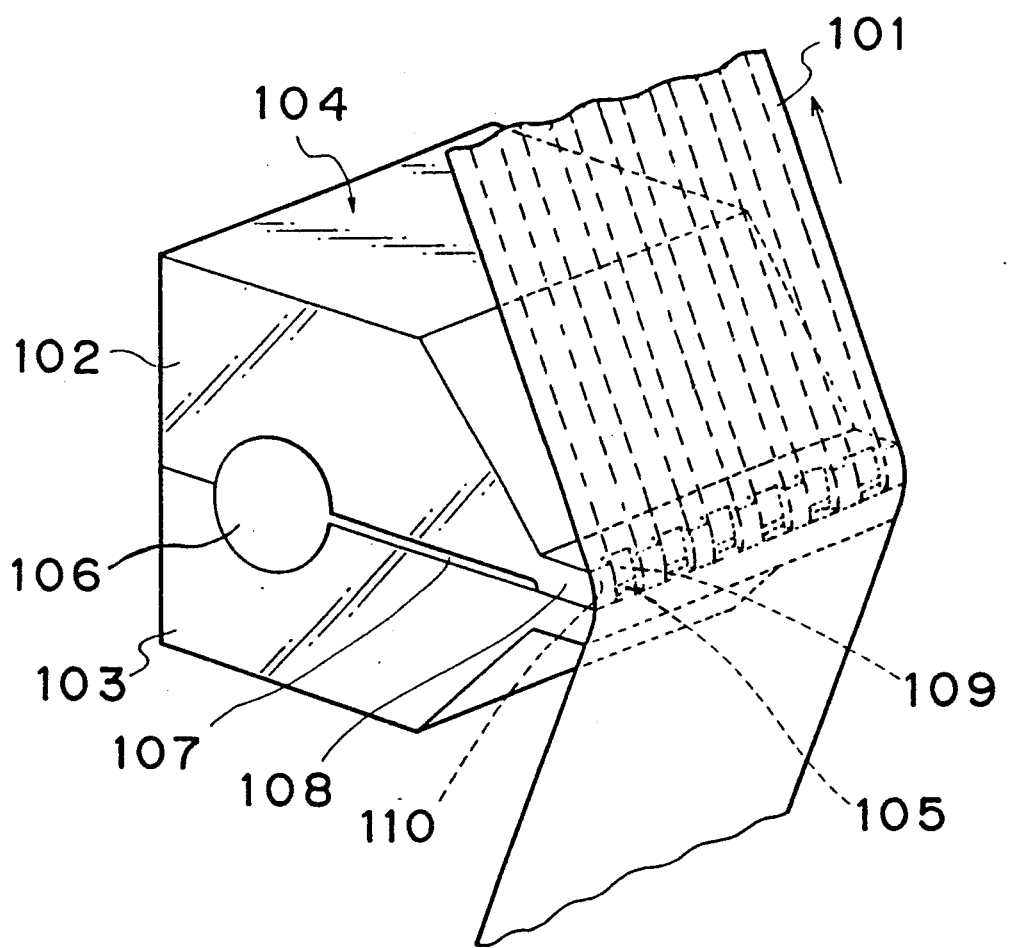
FIG. 9 is a perspective view showing the nozzle of a coating apparatus of the prior art.

In FIGS. 7 and 8, reference numeral 51 denotes a film, 54 a coating material discharge nozzle, 57 and 58 block-like applicator dies, 59 a lip portion, 60 a support surface, 13 a chamber for coating material, and 61 applicator grooves, the arrangement of these components being the same as in the second embodiment. Reference numeral 71 denotes a gas blowoff plate disposed opposite the lip portion 59, and shown by arrows A is a flow of air blown from the gas blowoff plate 71 toward the film 51. The rest of the arrangement is the same as shown in FIG. 1, with similar parts designated by the same reference numerals.

The gas blowoff plate 71 is so positioned that its 16 mm ×500 mm blowoff surface confronts the rear side of the film 51, and is so constructed as to allow the air A to be uniformly blown from the blowoff surface, by employing a sintered metal having approximately 40 μm holes therein. The end surface of the lip portion 59 is a 12 mm ×500 mm strip-shaped rectangular surface. With this arrangement, the distance between the gas blowoff plate 71 and the film 51 is set to 100 μm, and the air flow to be blown set at 3 cc/sec. Under these conditions, it is shown that the film 51 is stabilized in its travel even during high-speed coating at a travel speed of the film 51 of approximately 200 m/min and that a uniform, successful coating characteristic can be obtained. In this case, although the contact pressure of the film 51 against the support surface 60 is increased more than in the second embodiment, it will almost never happen that dust and film residue 68 adhere to the support surface 60.

It is to be noted here that although in the third embodiment the air A is blown against the film 51 in order to increase the contact pressure thereof, an equivalent effect can be achieved by utilizing a "dynamic pressure" caused by air adhering to the film 51 entering between the film 51 and the plate 71 accompanying the travel of the film 51.

In addition, it goes without saying that this third embodiment can also be applied in combination with the second embodiment of the present invention.

Although the present invention has been fully described by way of example with reference to the accompanying drawings, it is to be noted here that various changes and modifications will be apparent to those skilled in the art. Therefore, unless such changes and modifications depart from the scope of the present invention as defined by the appended claims, they should be construed as included therein.

What is claimed is:

1. An apparatus for applying coating material in stripe form onto a film traveling in a predetermined direction, which comprises:

film conveying means for conveying a film in a predetermined direction;

a coating material discharge nozzle for discharging a coating material and adapted to be contacted by the film traveling in the predetermined direction so as to support the film, said coating material discharge nozzle having a curved support surface for contacting the film and allowing the film to travel therealong, said nozzle having a plurality of applicator grooves in said support surface having a substantially constant depth and extending in the film traveling direction, said grooves being spaced in the width direction of the traveling film at substantially equal intervals, said nozzle having coating material discharge ports in the bottom of each of said applicator grooves to allow coating material to be discharged therethrough, said nozzle having gas discharge ports opening out of said support surface between each two applicator grooves; and means for supplying gas to said gas discharge ports of said coating material discharge nozzle.

2. An apparatus for applying coating material in stripe form onto a film traveling in a vertical direction, which comprises:

film conveying means for conveying a film in a vertical direction;

a coating material effusion nozzle for effusing a coating material effusion nozzle for effusing a coating material and adapted to be contacted by the film traveling in the vertical direction so as to support the film, said coating material effusion nozzle having a flat support surface for contacting the film and allowing the film to travel therealong with the surface pressure of the film against said flat surface being substantially zero, said nozzle having a plurality of applicator grooves in said support surface having a substantially constant depth and extending in the film traveling direction, said grooves being spaced in the width direction of the traveling film at substantially equal intervals, said nozzle having coating material effusion ports in the bottom of each of said applicator grooves to allow coating material to be effused therethrough; and means for supplying coating material to said coating effusion nozzle at a flow rate less than sufficient to completely fill said applicator grooves for causing said applicator grooves to be at a pressure lower than atmospheric, whereby the portions of the film which are over said applicator grooves are moved inwardly into said applicator grooves.

3. An apparatus for applying coating material in stripe form onto a film traveling in a vertical direction, which comprises:

film conveying means for conveying a film in a vertical direction;

a coating material effusion nozzle for effusing a coating material and adapted to be contacted by the film traveling in the vertical direction so as to support the film, said coating material effusion nozzle having a flat support surface for contacting the film and allowing the film to travel therealong with the surface pressure of the film against said flat surface being substantially zero, said nozzle having a plurality of applicator grooves in said support surface having a substantially constant depth and extending in the film traveling direction, said grooves being spaced in the width direction of the traveling film at substantially equal intervals, said nozzle having coating material effusion ports in the bottom of each of said applicator grooves to allow coating material to be effused therethrough;

means for supplying coating material to said coating material effusion nozzle; and gas blowing means in spaced opposed relation to said support surface for blowing a gas toward said support surface for pressing portions of the film overlying said applicator grooves toward said applicator grooves and thereby causing the coating material supplied to the applicator grooves to be stably applied to the traveling film.

* * * * *